(12) United States Patent
Audas et al.

(10) Patent No.: US 11,981,502 B2
(45) Date of Patent: May 14, 2024

(54) SYSTEMS AND METHODS FOR HDSS ROLL PACKAGING

(71) Applicant: BRIDGESTONE BANDAG, LLC, Muscatine, IA (US)

(72) Inventors: Milton B. Audas, Muscatine, IA (US); Jerod E. Schurr, Muscatine, IA (US); Merle R. Schlapkohl, Muscatine, IA (US); Timothy T. Foss, Muscatine, IA (US); Chad M. Zeck, Muscatine, IA (US); Alexander G. Tomtschik, Muscatine, IA (US)

(73) Assignee: Bridgestone Bandag, LLC, Nashville, TN (US)

( * ) Notice: Subject to any disclaimer, the term of this patent is extended or adjusted under 35 U.S.C. 154(b) by 233 days.

(21) Appl. No.: 17/470,336

(22) Filed: Sep. 9, 2021

(65) Prior Publication Data

US 2022/0073265 A1 Mar. 10, 2022

Related U.S. Application Data

(60) Provisional application No. 63/076,223, filed on Sep. 9, 2020.

(51) Int. Cl.
*B65D 85/672* (2006.01)
*B65B 11/04* (2006.01)
(Continued)

(52) U.S. Cl.
CPC ............ *B65D 85/672* (2013.01); *B65B 11/04* (2013.01); *B65B 63/04* (2013.01);
(Continued)

(58) Field of Classification Search
CPC ... B65D 71/00; B65D 71/0088; B65D 85/672
(Continued)

(56) References Cited

U.S. PATENT DOCUMENTS

| 4,155,519 A | * | 5/1979 | Price | B65H 49/36 206/394 |
|---|---|---|---|---|
| 4,757,950 A | | 7/1988 | Rodriguez | |

(Continued)

FOREIGN PATENT DOCUMENTS

| AU | 676379 | 8/1994 |
|---|---|---|
| DE | 19957990 | 6/2001 |

(Continued)

OTHER PUBLICATIONS

Calemard by Spoolex, "In-Line & Off-Line Winding Expert Since 1955!", www.tiretechnologyinternational.com, Nov. 2019, pp. 103-104.

(Continued)

*Primary Examiner* — Bryon P Gehman

(57) ABSTRACT

A skid assembly including a skid having a stacking surface and four gum rolls is provided. The gum rolls include a first gum roll positioned on the stacking surface and a second gum roll positioned on the stacking surface and abutting the first gum roll. The first and second gum rolls cooperate to define a first skid layer. The gum rolls further include third and fourth gum rolls each positioned on one of the first or second gum rolls. The fourth gum roll abuts the third gum roll, and the third and fourth gum rolls both cooperate to form a second skid layer. The gum rolls are formed of a strip stock wound onto a core fixture. The strip stock is coated to prevent the strip stock from adhering to itself while being wound into the gum roll.

10 Claims, 12 Drawing Sheets

(51) Int. Cl.
  *B65B 63/04* (2006.01)
  *B65D 71/00* (2006.01)
  *B65H 18/10* (2006.01)
  *B65H 19/22* (2006.01)
  *B65H 19/30* (2006.01)

(52) U.S. Cl.
  CPC ......... *B65D 71/0088* (2013.01); *B65H 18/10* (2013.01); *B65H 19/2207* (2013.01); *B65H 19/2292* (2013.01); *B65H 19/30* (2013.01); *B65H 2301/41446* (2013.01)

(58) Field of Classification Search
  USPC ................ 206/386, 391–394, 497, 595–600
  See application file for complete search history.

(56) References Cited

U.S. PATENT DOCUMENTS

| | | | | |
|---|---|---|---|---|
| 5,163,556 | A | * | 11/1992 | Akao ................. G03C 3/00 206/394 |
| 5,256,232 | A | | 10/1993 | Fuss et al. |
| 5,344,014 | A | * | 9/1994 | Toral ............. B65D 71/0096 206/394 |
| 5,368,157 | A | * | 11/1994 | Gasparrini .......... B65D 85/672 206/497 |
| 5,967,437 | A | | 10/1999 | Martin-Cocher et al. |
| 6,047,523 | A | * | 4/2000 | Eyre .................... B65B 11/025 206/391 |
| 2009/0020045 | A1 | | 1/2009 | Brunsmann et al. |
| 2011/0259498 | A1 | | 10/2011 | Pagano et al. |
| 2012/0041128 | A1 | | 2/2012 | Kosso |

FOREIGN PATENT DOCUMENTS

| | | | |
|---|---|---|---|
| EP | 0 681 212 | 11/1995 | |
| EP | 1 145 836 | 10/2001 | |
| EP | 1 236 669 | 9/2002 | |
| EP | 1 818 163 | 8/2007 | |
| EP | 2 116 496 | 11/2009 | |
| JP | 202070042 A | * 5/2020 | .......... B65D 85/672 |
| WO | WO-01/21520 | 3/2001 | |
| WO | WO-2016/103077 | 6/2016 | |

OTHER PUBLICATIONS

EP Search Report for EP Application No. 21195850.9, dated Jan. 26, 2022.
G.E., Quality Management System—Supplier Packaging and Shipping Procedure, Sep. 7, 2017, pp. 1-40.
https://www.adezif.com/long-length-technical-adhesive-tape-spooling-rolls, "Long-length adhesive rolls or spools," Jul. 23, 2020.
https://www.mueller-frick.com/fileadmin/storage/Datenimport/Leaflets/AM/UV60_R_UV60_RS/UV60-R_RS_61160_03_17_en.pdf, "Roll and Spool Winder," 2017.
https://www.semanticscholar.org/paper/2.-Processability%2C-characterisation-and-properties-Banerjee/a1f9a8d4b4229a9769a8e1056d8c3170c2a86866, 2019.
Mushiri, T., Design of a paper slitting and rewinding machine for a developing country, Zimbabwe, Proceedings of the 2016 International Conference on Industrial Engineering and Operations management, Sep. 23-25, 2016, pp. 1-11.

* cited by examiner

SYSTEMS AND METHODS FOR HDSS ROLL PACKAGING

CROSS-REFERENCE TO RELATED APPLICATIONS

This application claims priority to and the benefit of U.S. Provisional Application No. 63/076,223, filed on Sep. 9, 2020, the content of which is incorporated by reference in its entirety.

BACKGROUND

Retreaded tires provide an economical way to gain additional use from tire casings after the original tread or retread has become worn. According to a conventional method of retreading, sometimes referred to as cold process retreading, worn tire tread on a used tire is removed to create a buffed, treadless surface about the circumference of the tire casing to which a new layer of tread may be bonded.

The tire casing is then typically inspected for injuries, some of which may be skived and filled with a repair gum while others may be severe enough to warrant rejection of the casing. Next, a layer of cushion gum may be applied to the back, i.e., the inside surface of a new layer of tread, or alternatively, the layer of cushion gum may be applied directly to the tacky surface on the tire casing. Conventionally, the cushion gum is a layer of uncured rubber material. The cushion gum and tread may be applied in combination about the circumference of the tire casing to create a retreaded tire assembly for curing. As an alternative, a length of tire tread may be wrapped around the tire casing with the cushion gum already applied. The cushion gum may form the bond between the tread and the tire casing during curing.

Cushion gum presents unique challenges in packaging, handling, and shipping because cushion gum is a volatile, uncured adhesive material. For example, cushion gum may cure to itself during shipping due to high temperatures, high pressures, or both. Sometimes, cushion gum may be crushed during transportation, which may affect throughput, resulting in additional cost to reimburse and rework affected cushion gum. Thus, there exists a desire for a method and system for packaging cushion gum that results in few instances of damaged work product.

SUMMARY

According to a first set of embodiments, a method of forming a gum roll is provided. The method includes providing a strip stock having a first end, a first surface, and a second surface opposite to the first surface; coupling the first end to a core fixture so the first surface interfaces with the core fixture; and rotating the core fixture to wind the strip stock onto the core fixture such that the first surface interfaces with the second surface to form a gum roll.

According to a second set of embodiments, a skid assembly is provided. The skid assembly includes a skid having a stacking surface, a first gum roll positioned on the stacking surface; and a second gum roll positioned on the first gum roll.

According to a third set of embodiments, a skid assembly is provided. The skid assembly includes a skid having a stacking surface, a first gum roll positioned on the stacking surface, and a second gum roll positioned on the stacking surface and abutting the first gum roll. The first gum roll and the second gum roll cooperate to define a first skid layer. The skid assembly further includes a third gum roll positioned on one of the first gum roll or the second gum roll and a fourth gum roll positioned on one of the second gum roll or the second gum roll such that the fourth gum roll abuts the third gum roll. The fourth gum roll and the third gum roll cooperate to form a second skid layer.

BRIEF DESCRIPTION OF THE DRAWINGS

By way of example only, other embodiments of the present disclosure will be described more filly hereinafter with reference to the accompanying figures, in which like numbers refer to like parts throughout, wherein.

DETAILED DESCRIPTION

Following below are more detailed descriptions of various concepts related to, and implementations of, packaging a cushion gum for use in retreading a tire. The various concepts introduced above and discussed in greater detail below may be implemented in any of a number of ways, as the described concepts are not limited to any particular manner of implementation. Examples of specific implementations and applications are provided primarily for illustrative purposes.

Tires are used in various applications and under a variety of circumstances. Some tires may be designed to withstand the forces of a landing aircraft. Some tires may be designed to provide extra grip on surfaces covered in snow and ice. Some tires may be manufactured to be more suited to be repairable and retreaded.

In some instances, it may be desirable to use an uncured or unvulcanized rubber adhesive (e.g., cushion gum, highly dispersible precipitated silicas (HDSS), liquid adhesive, etc.) to bind (e.g., couple, vulcanize, adhere, etc.) a precured tire tread to a tire casing.

The uncured rubber adhesive may be formed into long adhesive strips approximately 0.375 inches thick, 5.25 inches wide, and 15 feet long. However, it should be understood that other dimensions, including slight manufacturing variations in the disclosed dimensions, are possible. For example, the adhesive strips may vary in width and thickness along the length of the adhesive strip. In some embodiments, the adhesive strips are formed into a substantially continuous length. In some embodiments, the adhesive strips are cut from a large sheet of adhesive.

After the adhesive strip is formed, the adhesive strip is packaged, such as for shipping to a manufacturing facility that retreads tires. The adhesive strips may be packaged in a box having individual cells that receive lengths of the adhesive strip, folded over upon itself as the adhesive strip is fed into the cell.

In some embodiments, the adhesive strip is rolled up, forming a cushion gum roll. Four cushion gum rolls may be laid flat on a pallet or skid to form a skid layer. Multiple skid layers may be positioned on a single skid or pallet. A film or buffer may be positioned between each of the skid layers. In some embodiments, the cushion gum rolls are "naked," meaning that the cushion gum rolls are not wrapped in a film, and that no separators or barriers are positioned between the cushion gum rolls of the same skid layer. Once the skid includes the desired number of skid layers (e.g., 2, 3, 4, 5, etc.), the skid may be skid wrapped.

In some embodiments, the cushion gum rolls may be individually wrapped in a film such that a skid layer includes four individually-wrapped cushion gum rolls. In some embodiments, the skid includes a top roll, positioned on top of the top skid layer to at least one of discourage or prevent stacking another skid on top of the cushion gum rolls.

Figure 1:
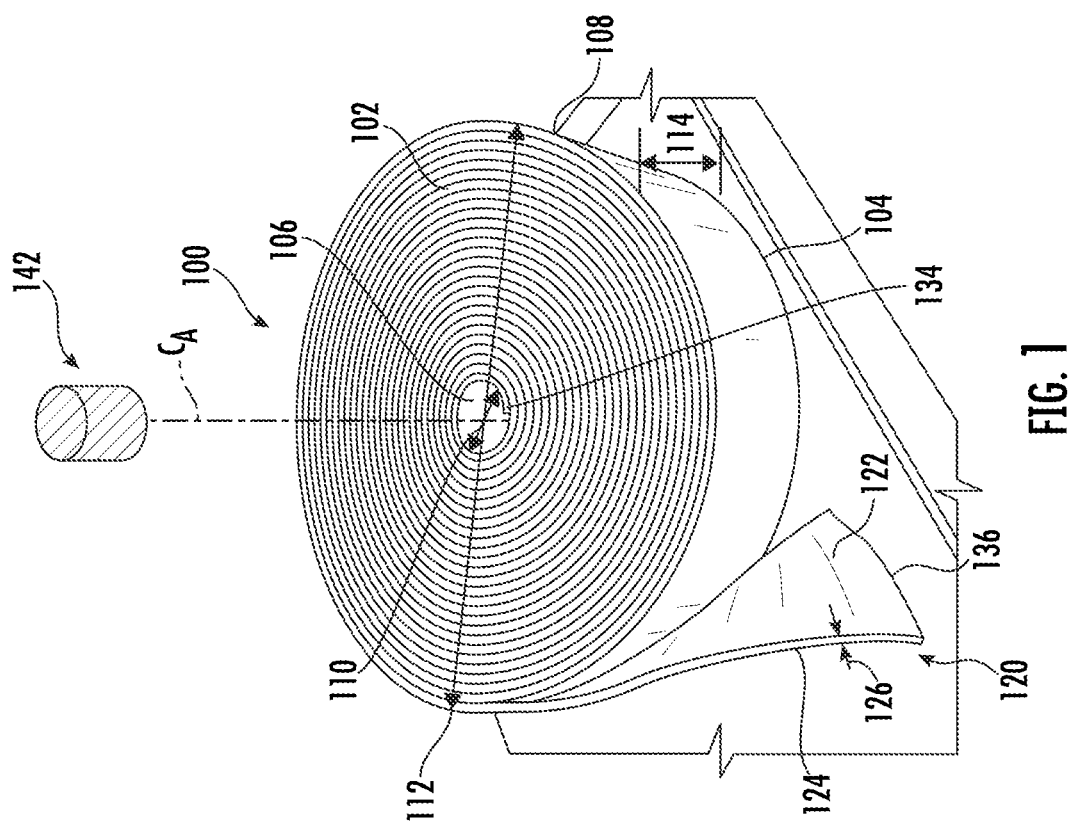
FIG. 1 is a top perspective view of a gum roll, according to an example embodiment.

Referring to FIG. 1, a gum roll (e.g., cushion gum roll, adhesive roll, etc.) 100 is shown, according to an example embodiment. The gum roll 100 defines a generally annular body having a first side 102, a second side 104 substantially parallel to and opposite the first side 102, an inner roll surface 106, an outer roll surface 108, an inner roll diameter 110, an outer roll diameter 112, a roll thickness 114, and a center axis $C_A$. In some embodiments, the gum roll 100 substantially defines an Archimedean spiral. The inner roll diameter 110 may be between 2-6 inches, inclusive. In some embodiments, the inner roll diameter 110 is approximately 3 inches. The outer roll diameter 112 may be between 10-60 inches. In some embodiments, the outer roll diameter 112 is between 20-50 inches, inclusive. In some embodiments, the outer roll diameter 112 is between 22-26 inches, inclusive. For example, the outer roll diameter 112 may be approximately 23.5 inches. In some embodiments, the outer roll diameter 112 is between 40-46 inches, inclusive. For example, the outer roller diameter 112 may be approximately 42 inches. In some embodiments, the outer roll diameter 112 is greater than 60 inches. In some embodiments, the outer roll diameter 112 is sized to fit on a skid or pallet. For example, the outer roll diameter 112 may be approximately equal to the size of the skid or pallet such that no portion of the gum roll 100 extends over the edge of the skid or pallet. The roll thickness 114 is defined as a distance between the first side 102 and the second side 104. The roll thickness 114 may vary across the entirety of the gum roll 100.

The central axis $C_A$ is defined as the central axis of the inner roll surface 106. The inner roll surface 106 may define a substantially circular cross-section such that the central axis $C_A$ extends through a center of the substantially circular cross-section. In some embodiments, the outer roll surface 108 defines a substantially circular cross-section and the central axis CAIS also the central axis of the outer roll surface 108. The gum roll 100 is formed from a strip stock 120, such as a strip stock of cushion gum, adhesive, rubber cement, highly dispersed precipitated silica (HDSS), or a similar material. The strip stock 120 may be pre-formed before being wound into the gum roll 100. For example, a strip stock 120 of HDSS may be manufactured and stored on a storage roll for a period of time (e.g., minutes, hours, days, weeks, etc.) before being unwound from the storage roll and wound into the gum roll 100. In some embodiments, the gum roll 100 is formed as part of the manufacturing processes for the strip stock 120. For example, a sheet of HDSS (e.g., sheet stock, etc.) is formed, cut into the strip stock 120, and wound into the gum roll 100. This avoids the additional steps of winding the strip stock 120 onto a roller for storage, and then unwinding the roll at a later time to form the gum roll 100.

The strip stock 120 includes a first surface 122 and a second surface 124 opposite the first surface 122 and substantially parallel to the first surface 122. A distance between the first surface 122 and the second surface 124 is shown as a stock thickness 126. The stock thickness 126 may be less than three inches. In some embodiments, the stock thickness 126 is less than one inch. In some embodiments, the stock thickness 126 is between 0.25-1 inches, inclusive. The HDSS, and thus the strip stock 120, may be pliable, malleable, and formable such that the stock thickness 126 varies across the entirety of the strip stock 120.

Figure 2:
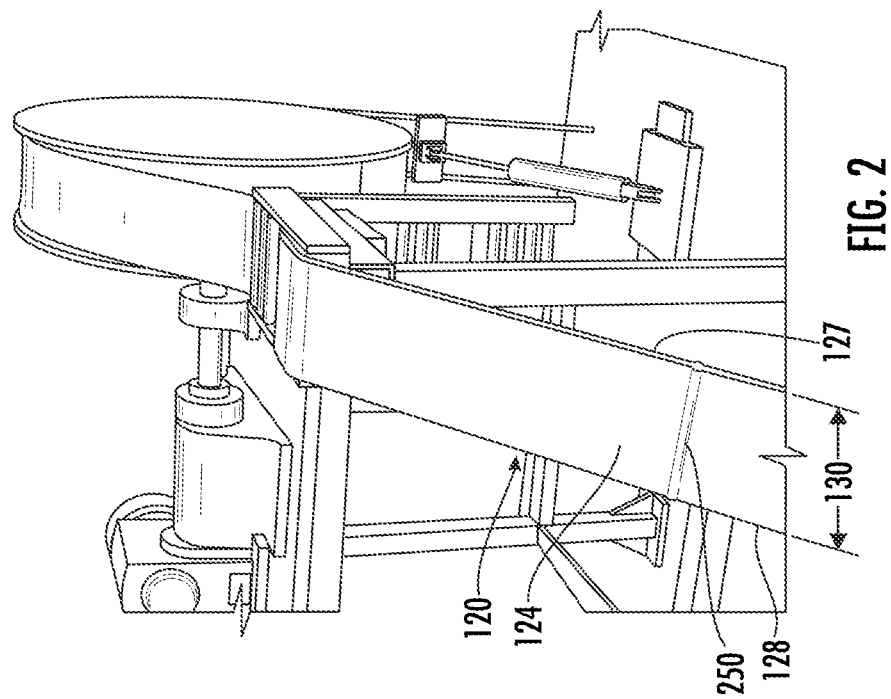
FIG. 2 is a perspective view of strip stock being wound by a winding system to form the gum roll of FIG. 1.

Referring now to FIG. 2, the strip stock 120 is shown being wound into the gum roll 100. The strip stock further includes a first edge 127 and a second edge 128 opposite to the first edge 127. A distance between the first edge 127 and the second edge 128 is shown as a stock width 130. The stock width 130 may be between 3-8 inches, inclusive. In some embodiments, the stock width 130 is between 5-6 inches, inclusive. Similar to the stock thickness 126, the stock width 130 may vary between the first edge 127 and the second edge 128 along a length of the strip stock 120 due to manufacturing tolerances and the pliability of the HDSS. In some embodiments, the stock thickness 126 and the stock width 130 may be out of tolerance with the desired manufacturing tolerances.

Referring again to FIG. 1, the strip stock 120 further includes a first end 134 and a second end 136. The first end 134 and the second end 136 are separated by a distance, referred to herein as a stock length. The stock length is defined as the shortest distance between the first end 134 and the second end 136 along a continuous, unbroken line that lies on the first surface 122. This is in contrast to the absolute distance between the first end 134 and the second end 136, shown in FIG. 1 as being less than the outer roll diameter 112 (e.g., approximately one-half the outer roll diameter 112 minus one-half of the inner roll diameter 110). The stock length may be less than 100 feet. For example, the stock length maybe between 40-100 feet. In some embodiments, the stock length is greater than 100 feet (e.g., 120 feet, 200 feet, 500 feet, etc.).

In some embodiments, the gum roll 100 includes a structural support core 142 extending along the central axis $C_A$ and interfacing with the inner roll surface 106. The structural support core 142 may be formed of cardboard or a similar disposable material that provides support for a single gum roll 100. In some embodiments, the structural support core 142 is solid and substantially rigid such that the sides of the structural support core 142 can withstand large forces without compressing or deforming. In some embodiments, the structural support core 142 is a spring core, or a cylindrical sleeve that has a hollow center and is configured to be compressed during insertion and removal. In some embodiments, the structural support core 142 is formed of plastic, metal, wood, or a similar material such that the structural support core 142 may be reused for multiple gum rolls. In some embodiments, the gum roll 100 is coreless, meaning that the gum roll 100 does not include a structural support (e.g., the structural support core 142) positioned proximate to the inner roll surface 106. When a gum roll 100 is coreless, the inner roll surface 106 (e.g., the first surface 122 proximate to the first end 134) is exposed to the atmosphere (e.g., exposed to air, uncovered, etc.). The gum roll 100 is formed of the strip stock 120 such that the first surface 122 interfaces with the second surface 124. In some embodiments, there is a buffer (e.g., film, fixture, paper, etc.) interposed between the first surface 122 and the second surface 124 to prevent the first surface 122 from interfacing with the second surface 124. In some embodiments, the strip stock 120 is coated with a powder (e.g., inert powder) or coating that prevents the strip stock 120 from adhering to itself while being wound into the gum roll 100. In some embodiments, the strip stock 120 is dipped in an anti-tack emulsion prior to being wound into the gum roll 100 to prevent the strip stock 120 from sticking to itself.

When the gum roll 100 has the desired outer roll diameter 112, the strip stock 120 is cut and the gum roll 100 is considered to be complete. In some embodiments, the gum roll 100 may include a splice 250. For example, the strip stock 120 may have a strip length that is too short to form the gum roll 100 of the desired outer roll diameter 112. For example, 80 feet of strip stock may be required to form the gum roll 100 of the desired outer roll diameter 112, but a first strip stock may have a strip length of only 40 feet. Thus, the second end 136 of the first strip stock may be spliced with (e.g., coupled to, hot spliced, etc.) a first end of a second strip stock to form the gum roll 100 having the desired outer roll diameter 112. In some embodiments, a third strip stock may be required to form the gum roll 100, the third strip stock joined to the second strip stock with a second splice. It should be understood that the gum roll 100 may include many splices that join many strip stocks (e.g., 1, 2, 3, 5, 8, etc.).

Figure 3:
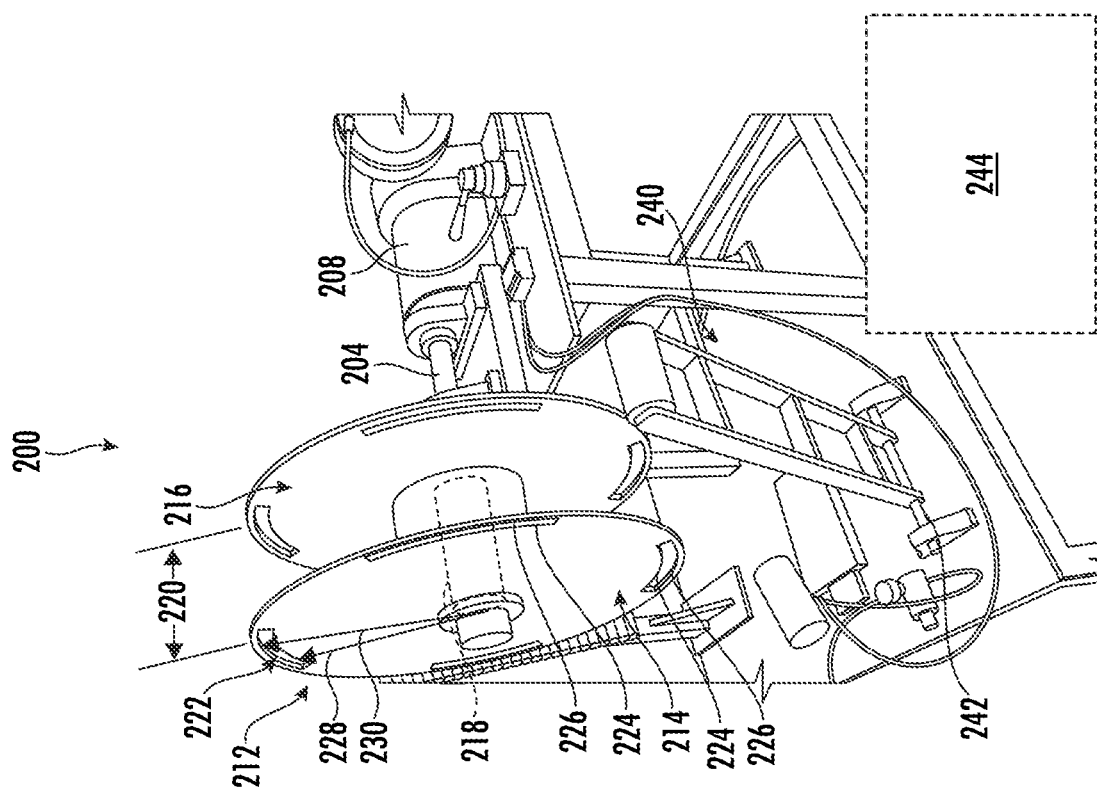
FIG. 3 is a perspective view of the winding system of FIG. 2.

Referring now to FIG. 3, a first winding system 200 is shown, according to an example embodiment. The first winding system 200 includes a rotating spindle 204, an actuator 208, and a fixture assembly 212. The actuator 208 is configured to rotate the rotating spindle 204 and the fixture assembly 212. The fixture assembly 212 is coupled to the rotating spindle 204 such that the fixture assembly 212 rotates as the rotating spindle 204 rotates. The fixture assembly 212 includes a first fixture plate 214, a second fixture plate 216, and a core fixture 218. The first fixture plate 214, the second fixture plate 216, and the core fixture 218 are removably coupled to the rotating spindle 204 such that a central axis of the rotating spindle 204 extends through each of the first fixture plate 214, the second fixture plate 216, and the core fixture 218. The first fixture plate 214 and the second fixture plate 216 are separated by a distance, shown as a fixture width 220. The first fixture plate 214 and the second fixture plate 216 are configured to facilitate winding the gum roll 100. In some embodiments, the fixture width 220 is approximately equal to the roll thickness 114.

The first fixture plate 214 includes a fixture slot 222. The fixture slot 222 includes a first slot edge 224 and a second slot edge 226. The first slot edge 224 extends in a substantially circumferential direction with respect to a central axis of the rotating spindle 204. The first slot edge 224 is positioned a distance away from the central axis of the rotating spindle 204, the distance shown as a first edge radius 228. Similarly, the second slot edge 226 extends in a substantially circumferential direction with respect to the central axis of the rotating spindle 204. In some embodiments, the second slot edge 226 is concentric with the first slot edge 224. The second slot edge 226 is positioned radially away from the central axis of the rotating spindle 204 by a distance, shown as a second edge radius 230. The fixture slot 222 acts as a "Go/No Go" gauge, where the operator cuts the strip stock 120 when the gum roll 100 is visible through the fixture slot 222. Specifically, the gum roll 100 has the desired outer roll diameter 112 when a portion of the gum roll 100 extends radially away from the central axis of the rotating spindle 204 a distance equal to or greater than the first edge radius 228, but less than or equal to the second edge radius 230. In some embodiments, the first edge radius 228 is approximately 22 inches and the second edge radius 230 is approximately 23 inches.

In some embodiments, the first winding system 200 includes a pressure roller 240. The pressure roller 240 is configured to apply a radial force to the gum roll 100 in a direction generally toward the central axis of the rotating spindle 204 as the strip stock 120 is wound around the core fixture 218. The core fixture 218 may be a cylindrical sleeve or shaft that is removably coupled to the rotating spindle 204 and is structured to withstand the radially compressive forces caused by the winding of the strip stock 120. In some embodiments, the strip stock 120 is wound around the rotating spindle 204. The force applied by the pressure roller 240 may be adjusted to achieve a desired winding tension. In some embodiments, the pressure roller 240 includes a sensor 242, such as an encoder, that automatically determines the outer roll diameter 112 as the strip stock 120 is wound onto the core fixture 218. In some embodiments, the first winding system 200 may further include a cutting system 244 configured to cut the strip stock 120 when the sensor 242 detects that the outer roll diameter 112 is in the desired range.

Figure 4:
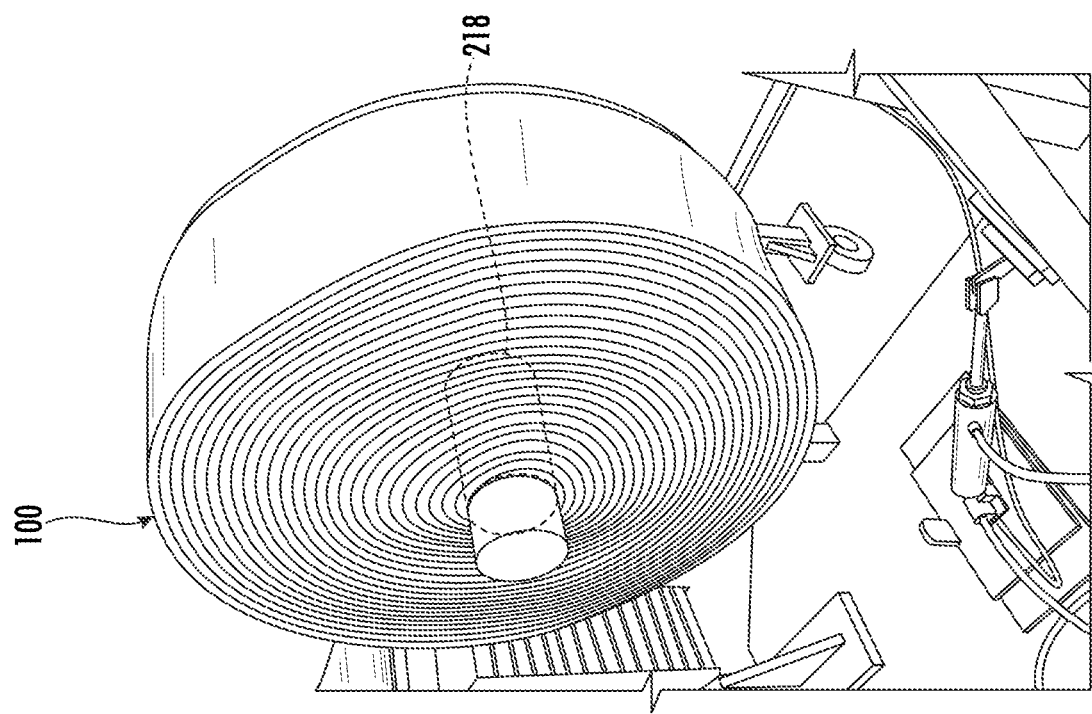
FIG. 4 is a perspective view of the gum roll of FIG. 1 on the winding system of FIG. 2.

As shown in FIG. 4, when the gum roll 100 has the desired outer roll diameter 112, the first fixture plate 214 may be removed from the first winding system 200 such that the gum roll 100 and the core fixture 218 may be removed from the first winding system 200. An assisted lifting device may be used to transport the gum roll 100 from the first winding system 200 to a skid or pallet. The gum roll 100 may be placed on a flat transport structure (e.g., skid, pallet, etc.), referred to herein as a skid 265, such that the first side 102 is facing the top of the skid 265. The skid 265 may be formed of plastic, press board, metal, cardboard, wood, and the like.

Figure 5:
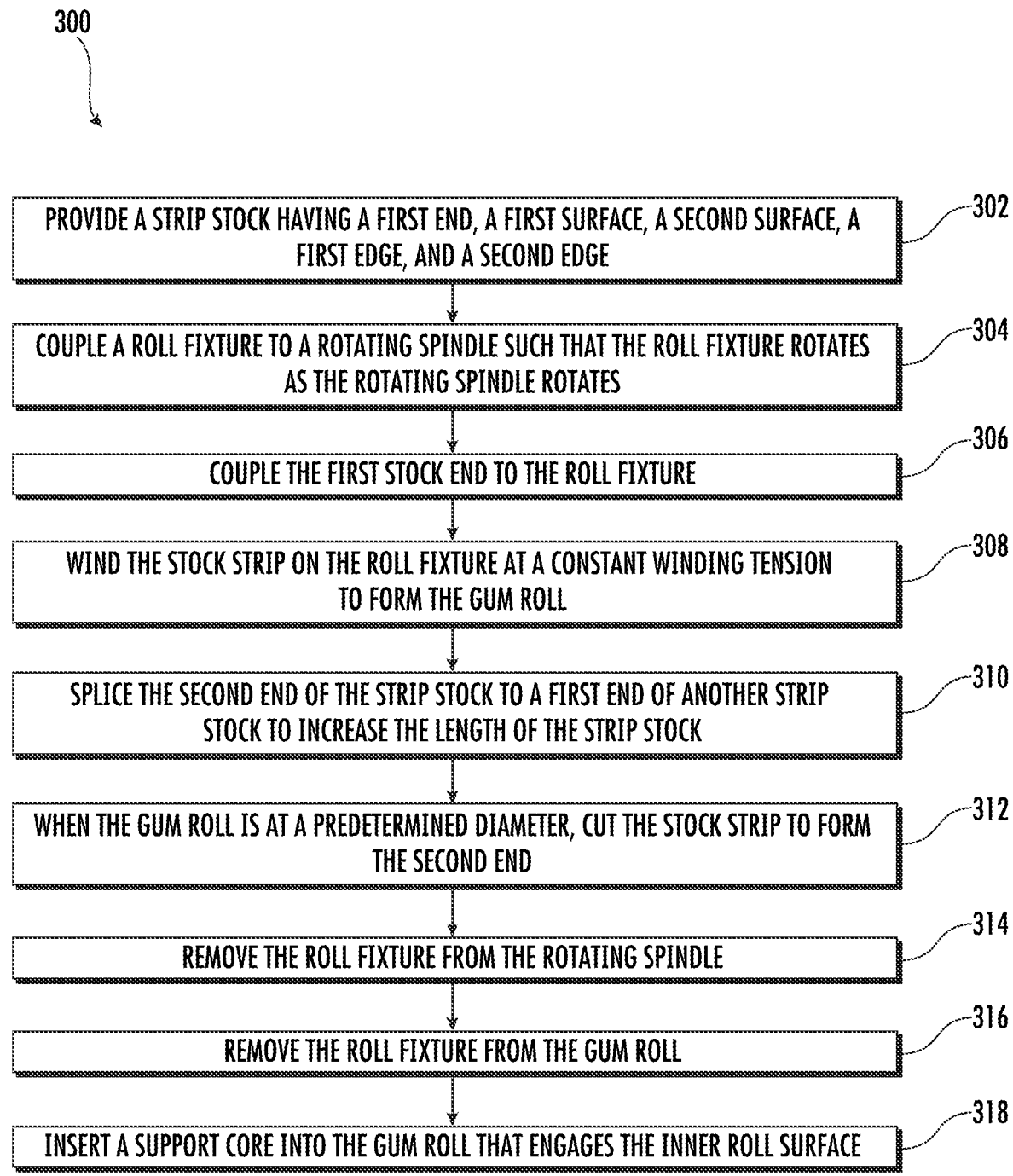
FIG. 5 is a flow diagram of a method of forming the gum roll of FIG. 1, according to an example embodiment.

Referring now to FIG. 5, a method 300 of forming the gum roll 100 is shown, according to an example embodiment. At 302, the strip stock 120 is provided. The strip stock 120 may be manufactured just before being wound into the gum roll 100. In some embodiments, the strip stock 120 is stored on a roll for a period of time prior to being wound into the gum roll 100.

At 304, the core fixture 218 is coupled to the rotating spindle 204 such that the core fixture 218 rotates as the rotating spindle 204 rotates. In some embodiments, the core fixture 218 is a hollow tube that is centered on the rotating spindle 204. In some embodiments, the core fixture 218 is an elongate bar coupled to the rotating spindle 204 at one end.

At 306, the first end 134 of the strip stock 120 is coupled to the core fixture 218. Specifically, the first end 134 is coupled to the core fixture 218 such that the first surface 122 of the strip stock 120 interfaces with an outer surface of the core fixture 218.

At 308, the rotating spindle 204 is rotated to wind the strip stock 120 onto the core fixture 218 to form the gum roll 100. In some embodiments, the pressure roller 240 is used to facilitate the winding tension of the gum roll 100. In some embodiments, the winding tension is controlled such that the gum roll 100 is formed using a constant winding tension.

At 310, the second end 136 of the strip stock 120 is spliced to a first end of another strip stock to increase the length of the strip stock 120. For example, if the strip stock 120 is too short to form the entire gum roll 100, another strip stock may be spliced to the second end 136 of the strip stock 120, and the winding of the gum roll 100 continues. In some embodiments, the strip stock 120 is of adequate length and this step 310 is not required.

At 312, the strip stock 120 (e.g., the first strip stock, the second strip stock, etc.) is cut to form the second end 136. The strip stock 120 may be cut when the outer roll diameter 112 reaches a desired diameter. In some embodiments, the second end 136 is crimped (e.g., impressed, deformed and coupled) to the gum roll 100 to prevent the second end 136 from separating from the gum roll 100, such as during transportation.

At 314, the core fixture 218 is removed from the rotating spindle 204. The gum roll 100 may be removed using an assistive lifting device, such as a fork lift, lift-assist, or a similar assistive lifting device.

At 316, the core fixture 218 is removed from the gum roll 100 such that the inner roll surface 106 is exposed to air. In some embodiments, the gum roll 100 may be laid flat on a pallet or skid before the core fixture 218 is removed from the gum roll 100. In some embodiments, the gum roll 100 may be removed from the core fixture 218 without removing the core fixture 218 from the rotating spindle 204.

At 318, the structural support core 142 is positioned within the gum roll 100 to replace the core fixture 218 and to provide support to the inner roll surface 106. The structural support core 142 is positioned within the gum roll 100 such that the structural support core 142 interfaces with the inner roll surface 106 of the gum roll 100.

Figure 6:
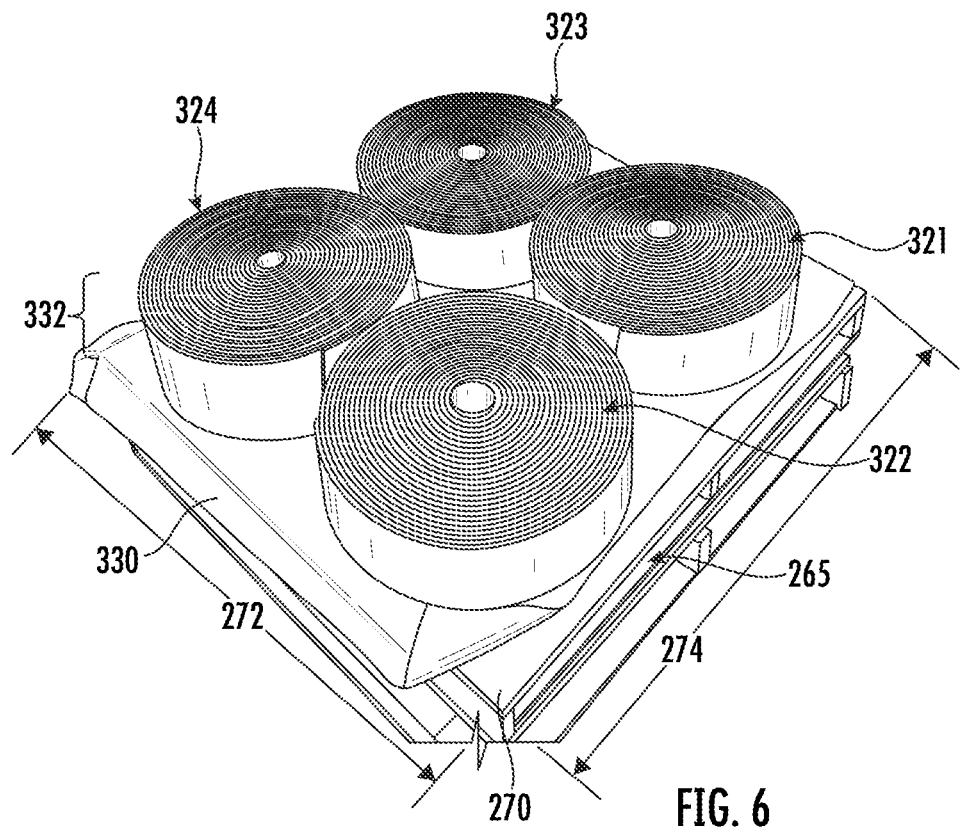
FIG. 6 is a perspective view of a skid including a skid layer formed of multiple gums rolls, according to an example embodiment.

Referring now to FIG. 6, the skid 265 is shown having a first gum roll 321, a second gum roll 322, a third gum roll 323, and a fourth gum roll 324 positioned thereon. Each of the first gum roll 321, the second gum roll 322, the third gum roll 323, and the fourth gum roll 324 are substantially similar to the gum roll 100. Accordingly, similar features are denoted with like numbering. Herein, the first gum roll 321, the second gum roll 322, the third gum roll 323, and the fourth gum roll 324 are collectively referred to as "the gum rolls 325."

The skid 265 defines a generally planner stacking surface 270 (e.g., first skid surface) having a skid width 272 and a skid length 274. In some embodiments, the stacking surface 270 is substantially square, the skid width 272 and the skid length 274 being approximately the same length. In some embodiments, the stacking surface 270 defines a polygon (e.g., regular polygon, irregular polygon) different from a square, such as a rectangle, trapezoid, rhombus, diamond, parallelogram, etc. In some embodiments, the skid width 272 and the skid length 274 are different lengths. In some embodiments, the skid 265 has a skid width 272 of approximately 44 inches and a skid length 274 of approximately 44 inches. In some embodiments, the skid 265 has a skid width 272 of approximately 48 inches and a skid length 274 of approximately 48 inches.

In some embodiments, each of the first gum roll 321, the second gum roll 322, the third gum roll 323, and the fourth gum roll 324 fit on the stacking surface 270 such that no portion of any of the first gum roll 321, the second gum roll 322, the third gum roll 323, and the fourth gum roll 324 extends beyond a perimeter of the stacking surface 270. In some embodiments, a portion of any of the first gum roll 321, the second gum roll 322, the third gum roll 323, and the fourth gum roll 324 may extend beyond the perimeter of the stacking surface 270 and hang over the edge of the skid 265. The first gum roll 321 may have the outer roll diameter 112 equal to or less than one half of the skid length 274. In some embodiments, each of the gum rolls 325 is defined by a substantially similar outer roll diameter 112 being approximately equal to one half of the skid length 274 such that the gum rolls 325 may be positioned on the stacking surface 270 without hanging over the edge of the skid 265.

Interposed between the gum rolls 325 and the stacking surface 270 may be a first film sheet (e.g., film, film barrier, etc.) 330 that prevents direct contact between the gum rolls 325 and the stacking surface 270. In some embodiments, the skid 265 may be formed of a material that fuses to the strip stock 120 immediately upon contact, and thus the first film sheet 330 is configured to prevent such contact. In some embodiments, the gum rolls 325 are naked and coreless, meaning that the strip stock 120 is exposed to the atmosphere when the gum rolls 325 are positioned on the stacking surface 270. The gum rolls 325 cooperate to form a first skid layer 332. The skid 265 may be configured to support many gum rolls, and thus multiple skid layers.

Figure 7:
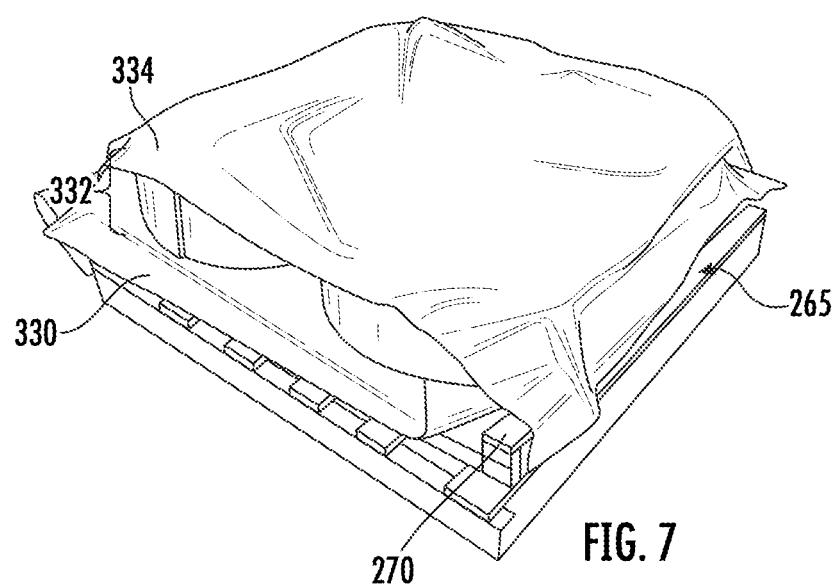
FIG. 7 is a perspective view of the skid of FIG. 6 including a film sheet positioned over the gums rolls, according to an example embodiment.
Figure 8:
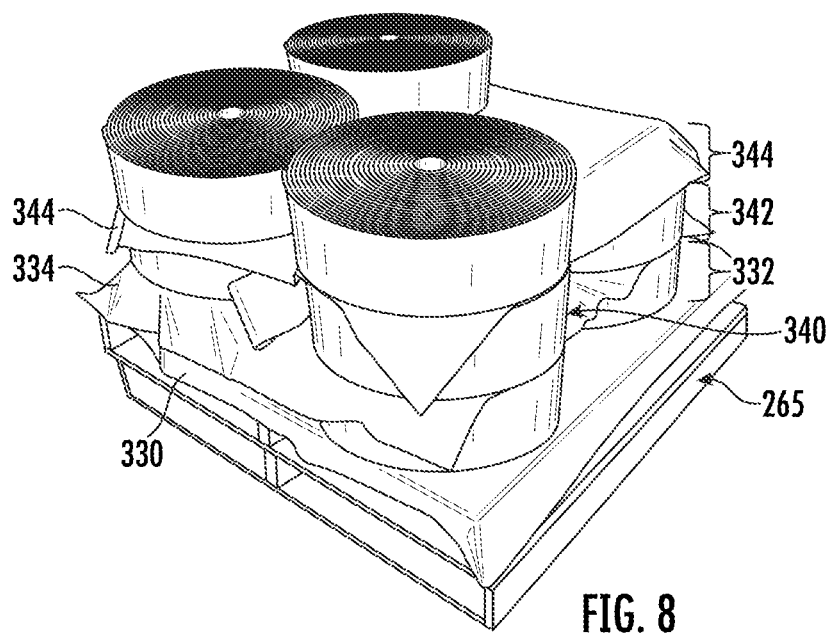
FIG. 8 is a perspective view of a skid including three skid layers.
Figure 9:
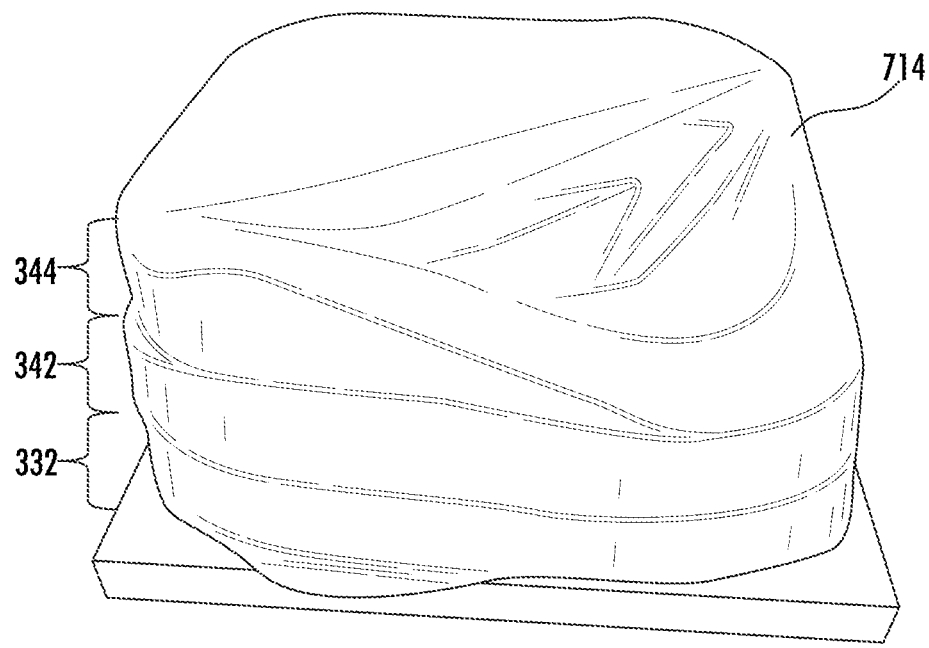
FIG. 9 is a perspective view of the skid of FIG. 8 after being skid wrapped.

Referring now to FIG. 7, a perspective view of the skid 265 having the first skid layer 332 is shown, according to another example embodiment. After forming the first skid layer 332 from the gum rolls 325, a second film sheet 334 may be positioned on top of the gum rolls 325. Specifically, the first side 102 of each of the gum rolls 325 may interface with the first film sheet 330, and the second side 104 of each of the gum rolls 325 interfaces with the second film sheet 334. After the second film sheet 334 is positioned on the gum rolls 325, a fifth gum roll 335, a sixth gum roll 336, a seventh gum roll 337, and an eighth gum roll 338, referred to herein as the gum rolls 340, may be positioned on the second film sheet 334 such that the fifth gum roll 335 is approximately concentric with the first gum roll 321, the sixth gum roll 336 is approximately concentric with the second gum roll 322, the seventh gum roll 337 is approximately concentric with the third gum roll 323, and the eighth gum roll 338 is approximately concentric with the fourth gum roll 324. The gum rolls 340 may be substantially similar to the gum roll 100. Collectively, the gum rolls 340 form a second skid layer 342. On top of the second skid layer 342, a third film sheet 344 may be positioned, shown in FIG. 8. After the third skid layer 346 is added to the skid 265, the skid 265 may be skid wrapped using poly film 714, as shown in FIG. 9. In some embodiments, film sheets (e.g., the first film sheet 330, the second film sheet 334, and the third film sheet 344) are not provided between the skid layers (e.g., between the first skid layer 332 and the second skid layer 342).

Figure 10:
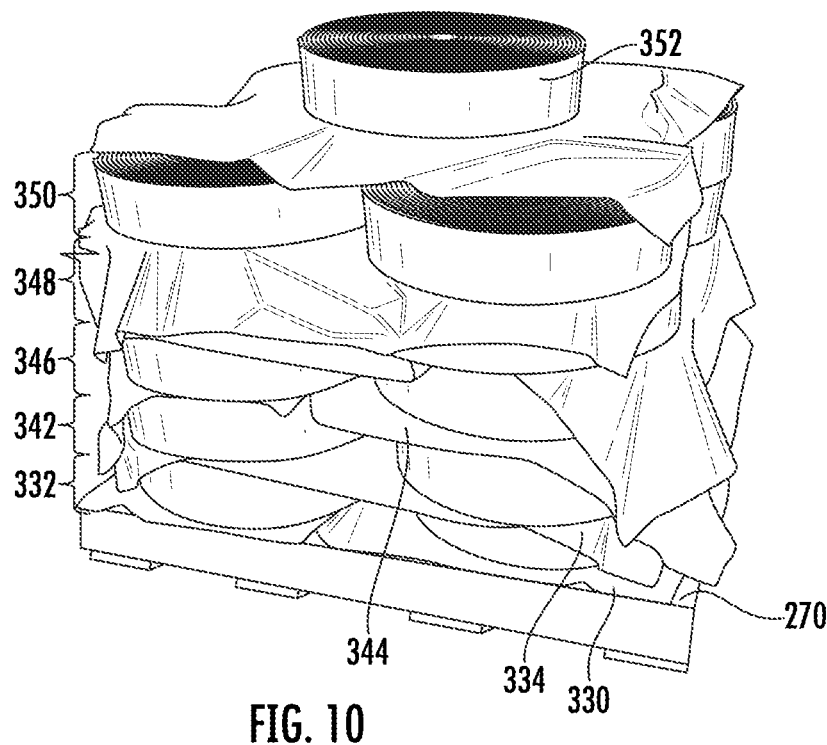
FIG. 10 is a perspective view of the skid of FIG. 8 including five skid layers and a final gum roll.
Figure 11:
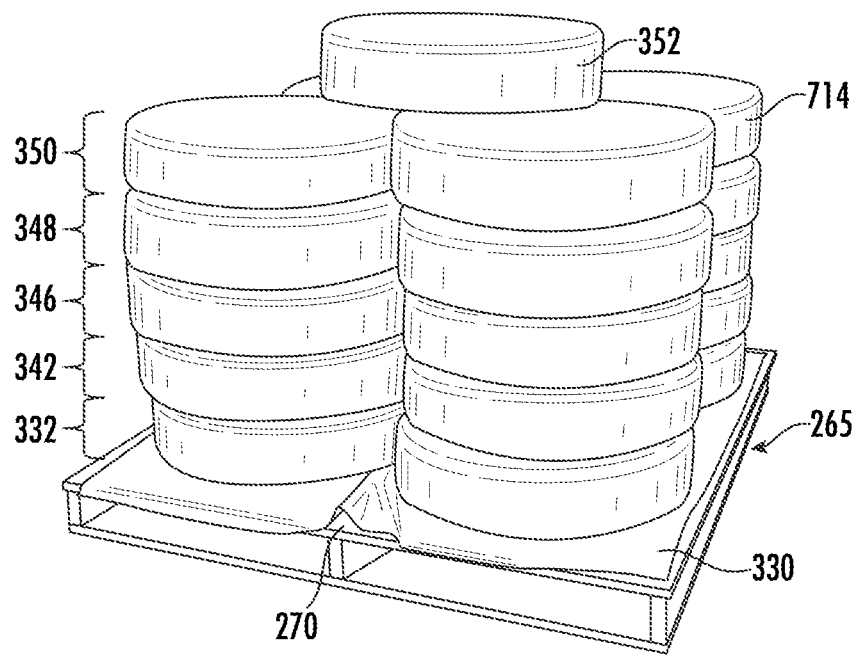
FIG. 11 is a perspective view of the skid of FIG. 10 including the five skid layers and the final gum, where each of the gum rolls is individually wrapped.

This pattern may be repeated until the skid 265 is loaded with a desired amount of gum rolls or until the skid 265 is loaded to a suggested load capacity. In some embodiments, the skid 265 includes four skid layers. In some embodiments, the skid 265 includes five skid layers. In some embodiments, the skid 265 includes six skid layers. In some embodiments, the skid 265 includes ten skid layers. As shown in FIG. 10, the skid 265 includes the first skid layer 332, the second skid layer 342, a third skid layer 346, a fourth skid layer 348, and a fifth skid layer 350. The third skid layer 346, the fourth skid layer 348, and the fifth skid layer 350 are similar to the first skid layer 332. It should be understood that the skid 265 may include most any number of skid layers (e.g., 1, 2, 3, 4, 5, etc.). In some embodiments, after the desired amount of skid layers are formed on the skid 265, a final gum roll 352 (similar to the gum roll 100) may be positioned on top of the top skid layer (e.g., the fifth skid layer 350) and centered relative to the stacking surface 270. The final gum roll 352 may be used to discourage stacking another skid pallet on top of the skid 265 loaded with five skid layers. In some embodiments, each of the gum rolls positioned on the skid 265 (e.g., the gum rolls 340, the gum rolls 325, the final gum roll 352) are individually wrapped. In some embodiments, each of the gum rolls positioned on the skid 265 are wrapped in poly film 714. For example, a skid wrapping machine or a luggage wrapping machine may be used to wrap the gum rolls. As shown in FIG. 11, the skid 265 is shown having the first skid layer 332, the second skid layer 342, the third skid layer 346, the fourth skid layer 348, and the fifth skid layer 350. Each of the skid layers may include four gum rolls wrapped in poly film 714. The final gum roll 352 may be wrapped in poly film 714 and positioned on the fifth skid layer 350 and centered relative to the stacking surface 270.

Figure 12:
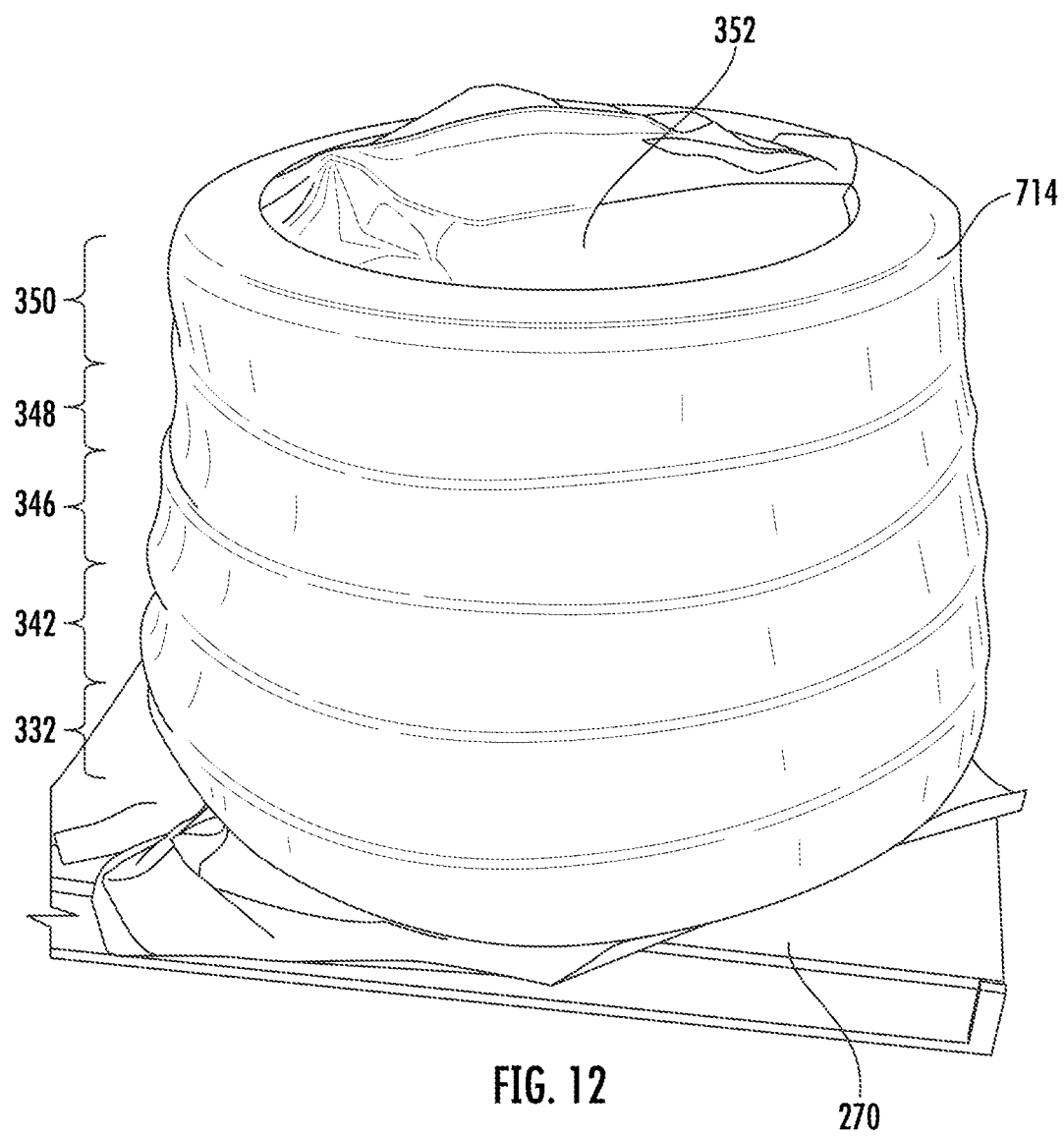
FIG. 12 is a perspective view of a skid having five skid layers, according to an example embodiment.

In some embodiments, the skid 265 may be substantially rectangular such that the gum rolls are loaded on the stacking surface 270 in a 2×3 configuration. In some embodiments, the gum rolls may be loaded on the stacking surface 270 in a triangular configuration such that three gum rolls form each of the skid layers. In some embodiments, such as shown in FIG. 12, the gum roll 100 may be formed to have an outer roll diameter 112 approximately equal to the skid length 274 such that the first skid layer 332 includes only one gum roll 100 and the gum roll 100 does not extend beyond the perimeter of the stacking surface 270. For example, if the skid width 272 and the skid length 274 are each approximately 48 inches, the gum roll 100 may be formed to have the outer roll diameter 112 measuring approximately, but not more than, 48 inches. In some embodiments, the gum roll 100 may have an outer roll diameter of 46 inches. In some embodiments, the gum roll 100 has an outer diameter of between 1 and 2 inches, inclusive, less than the shortest dimension (e.g., width, length) of the skid 265. For example, if the skid width 272 is 44 inches and the skid length 274 is 44 inches, the gum roll 100 may have a diameter between 42 and 43 inches, inclusive. The gum roll 100 may be placed on the first film sheet 330 on the stacking surface 270, and the second film sheet 334 may be placed on top of the gum roll 100 such that the gum roll 100 forms the entirely of the first skid layer 332. The skid 265 may include 2, 3, 4, 5, or more such gum rolls such that the skid 265 includes five or more skid layers, each of the skid layers formed of a single gum roll. In some embodiments, the skid 265 includes the final gum roll 352. The final gum roll 352 may define the outer roll diameter 112 less than the skid width 272. In some embodiments, the outer roll diameter 112 is approximately 40-60% of the skid width 272, inclusive.

Figure 13:
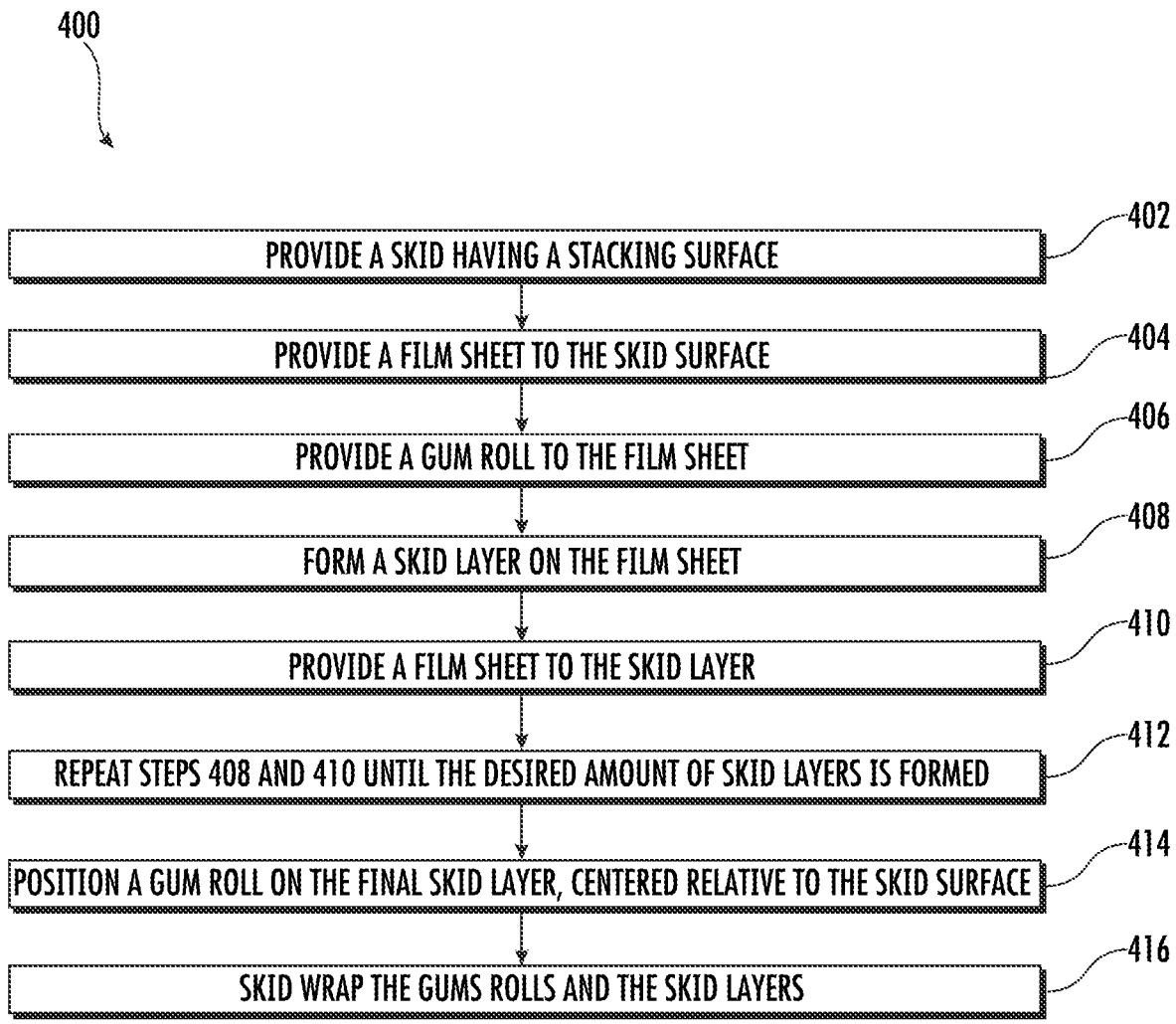
FIG. 13 is a flow chart of a method of forming a skid according to an example embodiment.

Referring now to FIG. 13, a method 400 of loading the skid 265 with gum rolls is shown according to an exemplary embodiment. At 402, the skid 265 having the stacking surface 270 is provided. The stacking surface 270 may be most any shape or size configured to receive the gum roll 100. In some embodiments, the stacking surface 270 is round such that material may be saved in the manufacturing of the skid 265.

At 404, the first film sheet 330 is positioned on the stacking surface 270. The first film sheet 330 may be formed of a polymer, an elastomer, or a similar material. In some embodiments, the first film sheet 330 is treated or coated such that the first film sheet 330 is resistant to curing to, sticking to, or permanently adhering to the gum roll 100. In some embodiments, the film sheet 330 is not provided. The gum roll 100 may be sized to have a diameter that is 1-3 inches less than one of the stacking width 272 or the stacking length 274. In some embodiments, the gum roll 100 is sized to have an outer roll diameter 112 that is between 1-2 inches less than at least one of the stacking width 272 or the stacking length 274. For example, if the stacking width 272 and the stacking length 274 are both 48 inches, the diameter of the gum roll 100 may be between 46-47 inches.

At 406, the gum roll 100 is provided on the first film sheet 330 such that no portion of the gum roll 100 extends beyond the perimeter of the stacking surface 270. In other words, the first side 102 (or second side 104) is positioned entirely on the first film sheet 330. In some embodiments, the gum rolls 325 are positioned in a 2×2 (two-by-two) configuration on the skid 265 such that no portion of any one of the gum rolls 325 extends beyond the perimeter of the stacking surface 270. In some embodiments, such as when the first film sheet 330 is not provided, the first side 102 is positioned on the stacking surface 270. The first side 102 is positioned entirely on the stacking surface 270.

At 408, the first skid layer 332 is formed on the first film sheet 330. Specifically, as shown in FIG. 6, the second gum roll 322 is positioned on the stacking surface, abutting the first gum roll 321. The first skid layer 332 may be formed only of naked, coreless gum rolls, such as the gum roll 100. In some embodiments, the gum rolls 325 form the first skid layer 332 and a divider is positioned between each of the gum rolls 325 to prevent any one of the gum rolls 325 from contacting another one of the gum rolls 325. In some embodiments, each one of the gum rolls 325 is individually wrapped in poly film 714. In some embodiments, the gum rolls 325 are individually wrapped in poly film before the gum rolls 325 are positioned on the stacking surface 270 to form the first skid layer 332.

At 410, the second film sheet 334 is positioned on the first skid layer 332 such that the first skid layer 332 is prevented from contacting the second skid layer 342. At 412, steps 408 and 410 may be repeated until the desired number of skid layers is formed. In some embodiments, the second film sheet 334 is not provided and the gum rolls 325 of the first skid layer 332 are able to interface with the gum rolls of the second skid layer 342.

At 414, the final gum roll 352, similar to the gum roll 100, is positioned on the final skid layer (e.g., the fifth skid layer 350) and centered relative to the stacking surface 270. The final gum roll 352 is positioned to discourage stacking another pallet or skid on top of the skid 265.

At 416, the skid layers (e.g., the first skid layer 332 and the second skid layer 342) are skid wrapped, such as using poly film 714 or similar material to wrap the skid layers and prevent shifting of the gum rolls during shipping.

Figure 14:
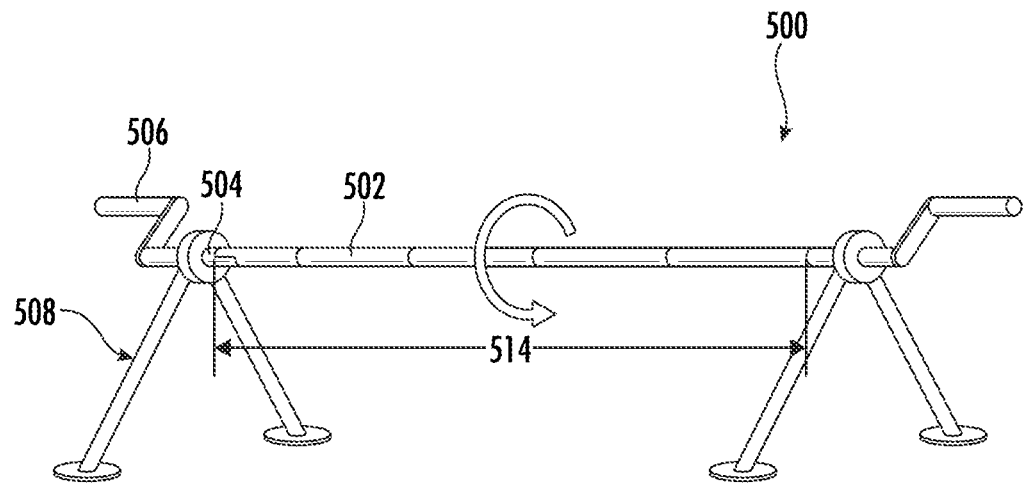
FIG. 14 is a perspective view of a winding system according to an example embodiment.
Figure 15:
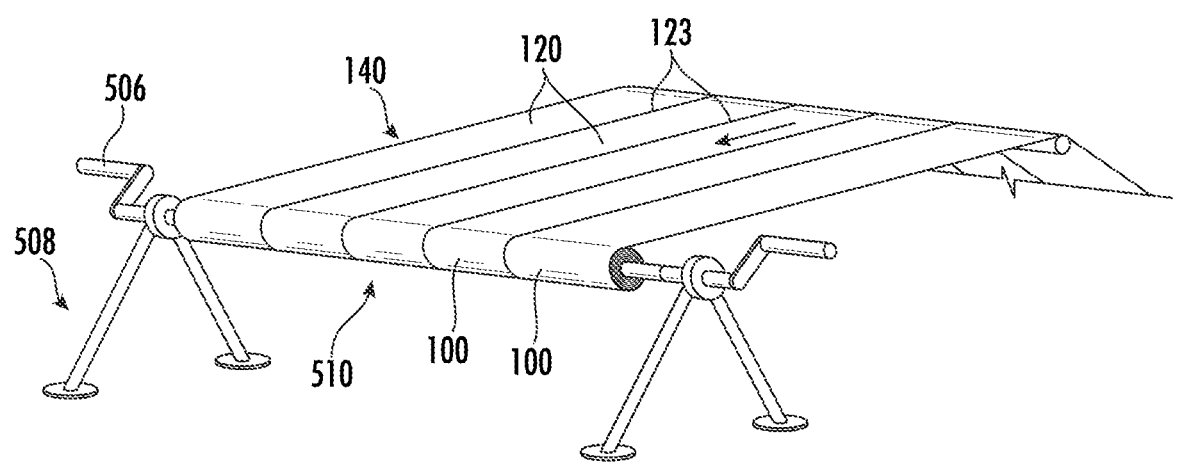
FIG. 15 is a perspective view of the winding system of FIG. 14 during a winding process.

Referring now to FIG. 14, a second winding system 500 for winding the strip stock 120 is shown, according to an example embodiment. The second winding system 500 includes a core fixture 502, a rotating spindle 504, a handle 506, and a support stand 508. The second winding system 500 is configured to wind the strip stock 120 into the gum roll 100 (e.g., the gum rolls 325). Specifically, the strip stock 120 may be formed as a sheet stock 140 prior to being scored or cut into the strip stock 120. As shown in FIG. 15, the sheet stock 140 has a width approximately equal to five times the stock width 130. The sheet stock 140 may include an incision 123 (e.g., cut, score, partial cut, perforation, etc.), each incision 123 corresponding to an edge of the strip stock 120. The sheet stock 140 may be coupled to the core fixture 502 and wound onto the core fixture such that an elongate roll 510 is formed, the elongate roll 510 including multiple gum rolls. For example, the sheet stock 140 may have a width approximately equal to five times the stock width 130 and the sheet stock may include four incisions 512, the incisions 512 facilitating separation of the strip stock 120 from the sheet stock 140, but the incisions 512 not fully separating the strip stock 120 from the sheet stock 140. The sheet stock 140 is wound onto the core fixture 502, the core fixture 502 defining a length 514 greater than the width of the sheet stock 140 such that no portion of the sheet stock 140, and similarly no portion of the elongate roll 510, extends beyond the ends of the core fixture 502. In some embodiments, the incisions 512 extend all the way through the sheet stock 140 and separate the sheet stock 140 into individual strip stocks 120. Thus, the individual strip stock 120 may be wound on the core fixture 502 in close proximity to one another forming individual gum rolls 100 that are not coupled to one another.

The core fixture 502 is removably coupled to the rotating spindle 504 such that the core fixture 502 may be removed from the second winding system 500 when the elongate roll 510 is at a desired diameter. The rotating spindle 504 is operatively coupled to the handle 506. In some embodiments, the handle 506 is rotated by hand, such as by an operator, to facilitate winding of the elongate roll 510 onto the core fixture 502. In some embodiments, the rotating spindle 504 is operatively coupled to an actuator configured to rotate the rotating spindle 504 and wind the sheet stock 140 on the core fixture 502. The core fixture 502, the rotating spindle 504, and the handle 506 are all supported by the support stand 508.

Figure 16:
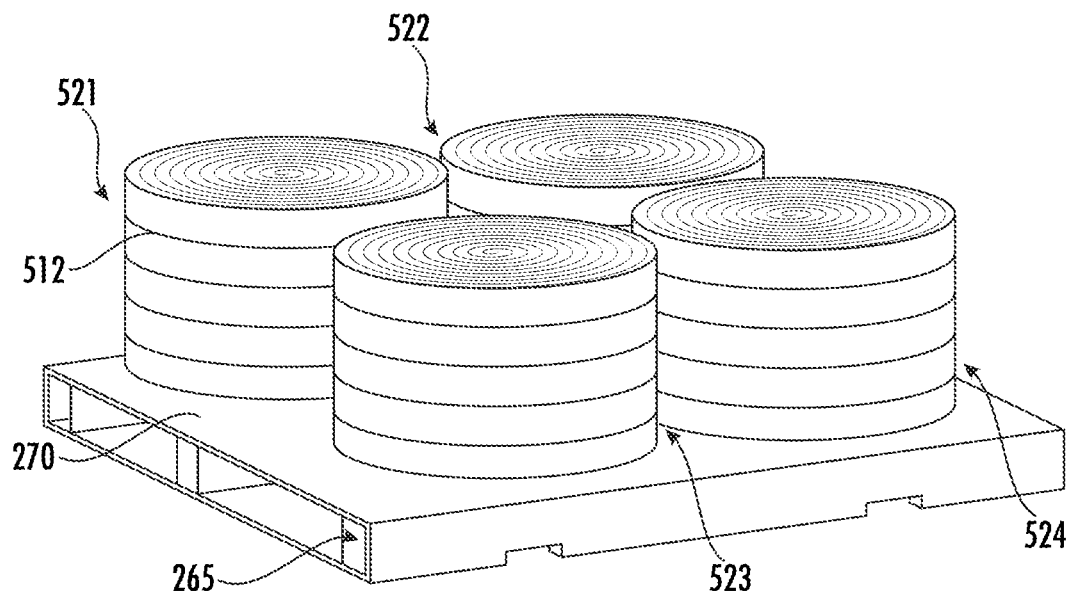
FIG. 16 is a perspective view of a skid including an elongate roll, according to an example embodiment.

Referring now to FIG. 16, the elongate roll 510 is shown positioned on the skid 265. A lifting device, such as a robotic arm or fork lift may transfer the elongate roll 510 from the second winding system 500 to the skid 265. The elongate roll 510 may be rotated sideways such that the core fixture 502 extends substantially perpendicular relative to the stacking surface 270. The elongate roll 510 may then be positioned on the skid 265 and the core fixture 502 may be removed from the elongate roll 510.

The elongate roll 510 may be positioned on the skid 265 without separating the individual gum rolls 100 from the elongate roll 510 via the incisions 512. Thus, the skid 265 may include the first film sheet 330 between the elongate roll 510 and the stacking surface 270, and the skid may include the second film sheet 334 on top of the elongate roll 510. In some embodiments, the skid 265 includes one elongate roll 510 positioned on the skid 265 and centered on the skid 265 relative to the stacking surface 270. The diameter of the elongate roll 510 may be slightly less than the skid length 274 and less than the skid width 272.

In some embodiments, the skid 265 includes a first elongate roll 521, a second elongate roll 522, a third elongate roll 523, and a fourth elongate roll 524, herein referred to collectively as the elongate rolls 525. The elongate rolls 525 may be positioned on the skid 265 in a two-by-two configuration. After the elongate rolls 525 are positioned on the skid 265, the elongate rolls 525 may be skid wrapped to prevent the elongate rolls 525 from shifting during shipping. While the elongate roll 510 is shown as including four incisions 512 and five gum rolls 100, the elongate roll 510 may include any number of incisions 512 or gum rolls 100 (e.g., two gum rolls 100 and one incision 512, three gum rolls 100 and two incisions, six gum rolls 100 and five incisions 512, etc.).

Figure 17:
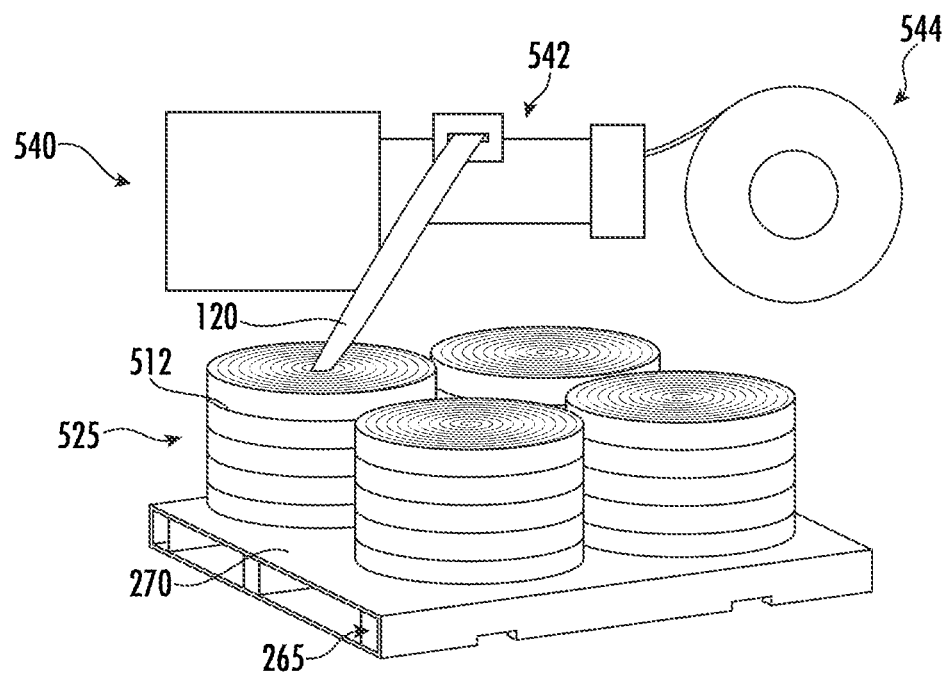
FIG. 17 is a perspective view of the skid of FIG. 16 in a retreading environment.

Turning now to FIG. 17, the skid 265 having the elongate rolls 525 is shown in a retreading environment. Positioned within the retreading environment may be a retreading system 540 including an extruder 542. The strip stock 120 is fed into the extruder 542, which then applies the strip stock 120 to a tire casing 544 during a retreading operation. The extruder 542 is configured to receive the strip stock 120 and extrude the strip stock 120 through a die, tube, or similar structure. The strip stock 120 is then applied to the tire casing 544 during a retread process. In some embodiments, extruding the strip stock 120 including heating up the strip stock 120 to activate the adhesive (e.g., tackifying) agents that cause the strip stock 120 to adhere to the tire casing 544. In some embodiments, the first end 134 is fed into the extruder 542. In other words, the strip stock 120 from the gum roll 100 is "center-fed." In some embodiments, the second end 136 is fed into the extruder 542. The gum roll 100 may still be coupled to the elongate roll 510 when the first end 134 is fed into the extruder 542. For example, the incision 512 may be a perforation that allows separation between the strip stock 120 of the gum roll 100 and the strip stock 120 of the adjacent gum roll when a predetermined force is applied, such as by the extruder 542. An operator may grab the first end 134 and separate the strip stock 120 proximate the first end 134 from the adjacent gum roll by pulling on the first end 134. As the first end 134, and thus the strip stock 120, is fed into the extruder 542, the strip stock 120 may separate from the adjacent gum roll along the incision 512. After the entire gum roll 100 has been used, the same process may be applied to the adjacent gum roll.

Figure 18:
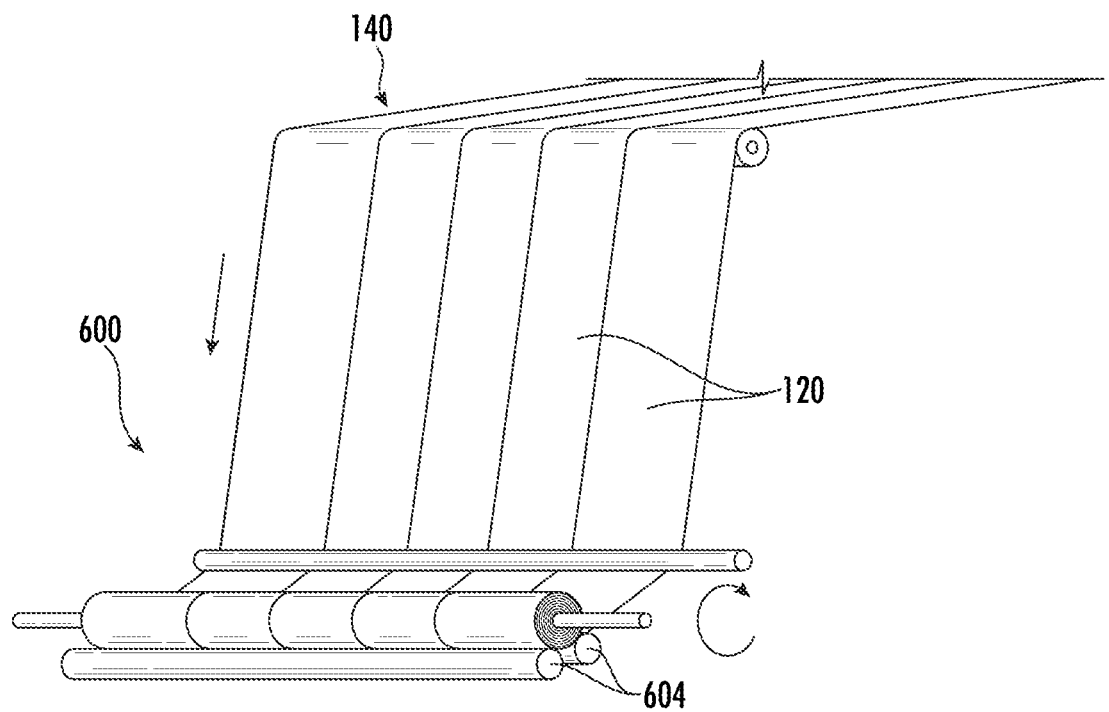
FIG. 18 is a perspective view of a portion of a winding system according to an example embodiment.

Referring now to FIG. 18, a third winding system 600 is shown, according to an example embodiment. The third winding system 600 is similar to the second winding system 500. A difference between the third winding system 600 and the second winding system 500 is that the third winding system 600 does not include the handle 506. The third winding system 600 includes a pair of drive rollers 604 configured to wind the sheet stock 140 into the elongate roll 510. The pair of drive rollers 604 interface with second surface 124 of the strip stock 120 (e.g., the second surface 124 of the sheet stock 140) and wind the sheet stock 140 into the elongate roll 510.

Figure 19:
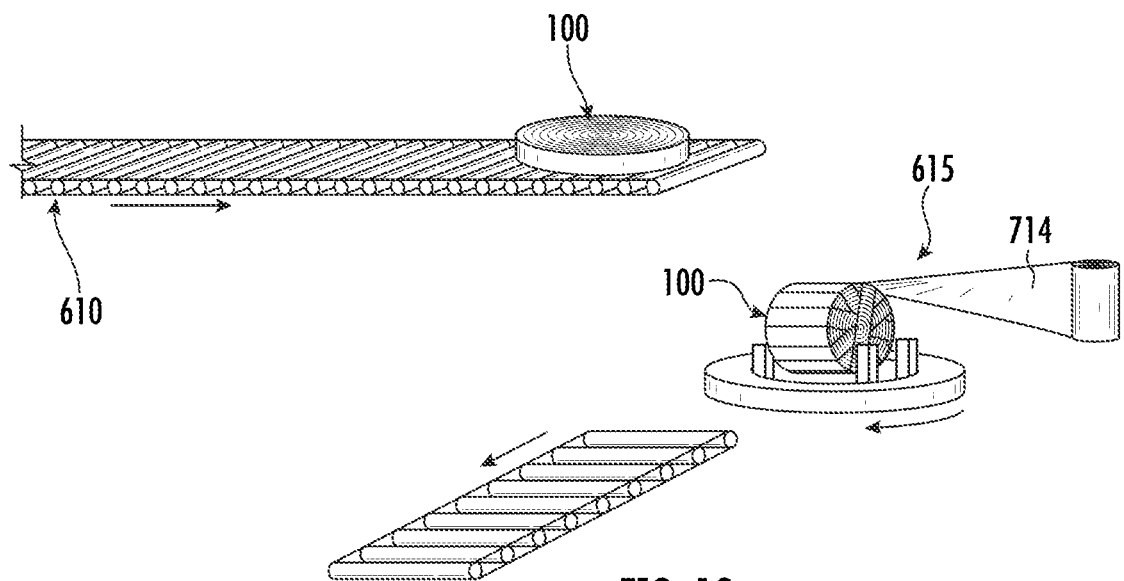
FIG. 19 is a perspective view of a portion of the winding system of FIG. 18.

Referring now to FIG. 19, the gum roll 100 is shown on a conveyor 610. The gum roll 100 travels down the conveyor 610 and is received by a wrapping system 615 configured to wrap the gum roll 100. The gum roll 100 may be wrapped in poly film 714 to prevent damage to the gum roll 100 during packaging and shipping. After the gum roll 100 is wrapped in poly film 714, the gum roll 100 is placed on the skid 265.

Figure 20:
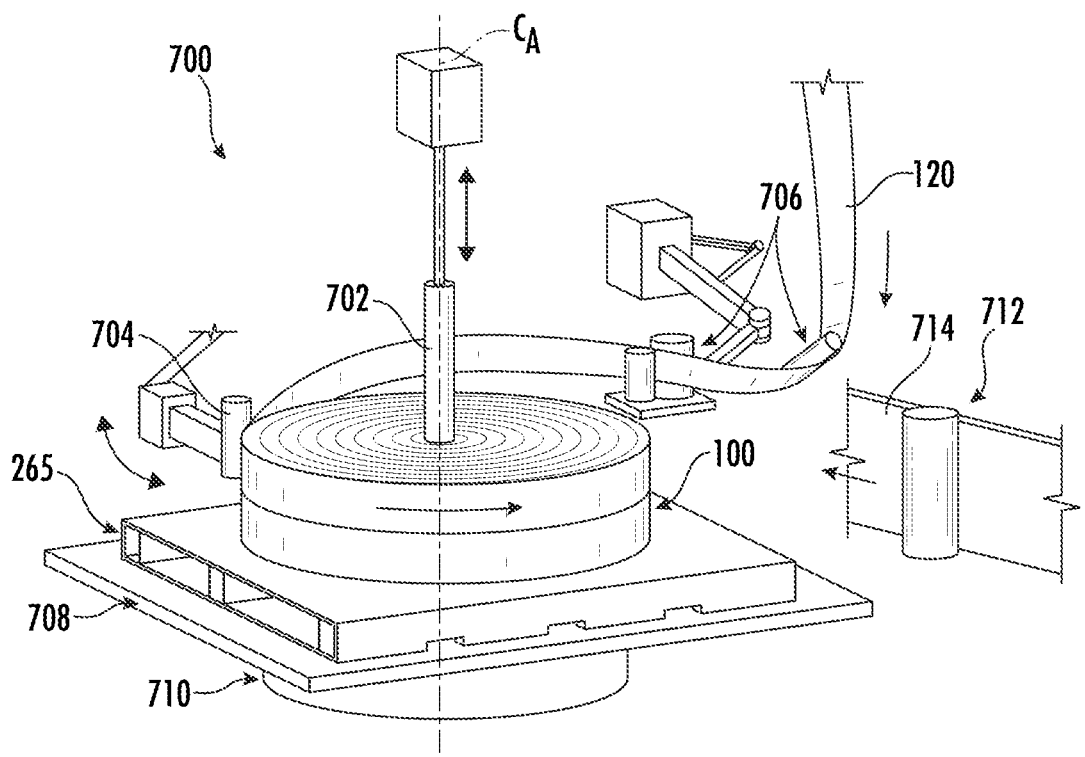
FIG. 20 is a perspective view of a winding system, according to another example embodiment.

Referring to FIG. 20, a fourth winding system 700 is shown according to an example embodiment. The fourth winding system 700 is configured to wind the gum roll 100 substantially horizontally such that the central axis $C_A$ is substantially parallel to gravity while the gum roll 100 is wound. The fourth winding system 700 includes a core fixture 702, a pressure roller 704, guide rollers 706, a rotating platform 708, and an actuator 710. The fourth winding system 700 is configured to wind the gum roll 100 directly on the skid 265, removing the intermediate step of having to rotate the gum roll 100 such that one of the first side 102 or the second side 104 is substantially parallel to the stacking surface 270. In some embodiments, the fourth winding system 700 winds all of the skid layers (e.g., five skid layers) at the same time.

To start the gum roll 100, the first end 134 may be coupled to the core fixture 702. The guide rollers 706 facilitate the positioning of the strip stock 120 to prevent the strip stock 120 from twisting or tearing during the winding of the gum roll 100. As shown, the strip stock 120 is initially fed in a vertical direction (e.g., the first edge 127 and the second edge 128 are substantially perpendicular to the skid 265). The guide rollers 706 redirect the strip stock 120 such that the strip stock 120 may be wound into the gum roll 100 in a horizontal direction. In other words, the guide rollers 706 may facilitate a substantially 90-degree turn in the feed direction of the strip stock 120 such that the first edge 127 and the second edge 128 are substantially parallel to the stacking surface 270. In some embodiments, the guide rollers 706 may redirect a feed direction of the sheet stock 140, such as if the sheet stock 140 is to be wound onto the core fixture 702 such that the elongate roll 510 is formed on the skid 265.

The skid 265 is placed on and may be coupled to the rotating platform 708 such that the skid 265 rotates as the rotating platform 708 rotates. In some embodiments, the core fixture 702 rotates as the rotating platform 708 rotates. The first end 134 of the strip stock 120 may be coupled to the core fixture 702 such that the first surface 122 proximate to the first end 134 interfaces with the core fixture 702. As the rotating platform 708 rotates, the strip stock 120 is wound onto the core fixture 702. The pressure roller 704 may interface with the second surface 124 of the strip stock 120 to maintain a consistent winding tension of the gum roll 100.

The core fixture 702 is positioned proximate to a center of the stacking surface 270 such that the gum roll 100 is centered on the skid 265 relative to the stacking surface 270. In some embodiments, a sleeve is provided around the core fixture 702 to facilitate removal of the core fixture 702 from the gum roll 100. The core fixture 702 is retractable such that after the gum roll 100 is formed, the core fixture 702 may be pulled upward away from the skid 265 and out of the middle of the gum roll 100 while sleeve remains positioned within the gum roll 100. When the desired diameter of the gum roll 100 is achieved, for example such that no portion of the gum roll 100 extends beyond the perimeter of the stacking surface 270, the strip stock 120 may be cut to form the second end 136. The first end 134 formed by the cut may be coupled to the core fixture 702 proximate to where the gum roll 100 is coupled to the core fixture 702. The process may be repeated to form a second gum roll on top of the gum roll 100 that was formed on the skid 265. In some embodiments, the second film sheet 334 may be positioned between the second gum roll and the gum roll 100. The gum roll 100 forms the first skid layer 332. The skid 265 may include multiple skid layers (e.g., the first skid layer 332 and the second skid layer 342) until the desired amount of skid layers are formed or until the load capacity of the skid 265 is achieved. In some embodiments, the skid 265 includes ten skid layers. In some embodiments, the final gum roll 352 is positioned on the final skid layer (e.g., the fifth skid layer 350, a sixth skid layer, an eight skid layer, etc.) to discourage stacking another pallet or skid on the skid 265.

After the skid 265 includes the desired amount of gum rolls, the skid layers may be skid wrapped. In some embodiments, the skid layers are skid wrapped using a poly film roller 712. The poly film 714 may be coupled to the skid layers, and the rotating platform 708 may rotate to unwind the poly film 714 from the poly film roller 712 and wind the poly film 714 on the skid layers. The core fixture 702 may be removed from the skid layers before or after the skid layers are skid wrapped.

Figure 21:
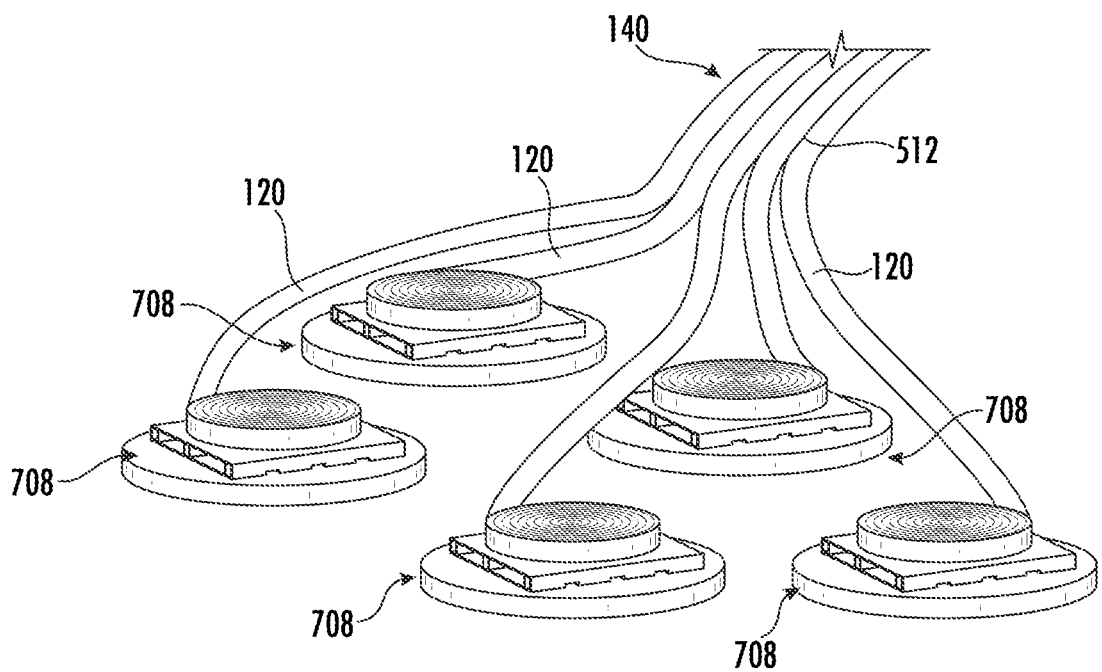
FIG. 21 is a perspective view of a plurality of the winding systems of FIG. 20.

Referring to FIG. 21, a plurality of the fourth winding systems 700 are shown. The sheet stock 140 is shown as including five strip stocks 120 and four incisions 512. As the sheet stock 140 is fed toward the plurality of fourth winding systems 700, the sheet stock 140 may be separated into the strip stock 120 along the incisions 512. All five of the shown fourth winding systems 700 may operate to wind the strip stock 120 at the same time such that the sheet stock 140 is wound into five of the gum rolls 100 at the same time.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the invention unless otherwise claimed. No language in the specification should be construed as indicating any non-claimed element as essential to the practice of the invention It should be noted that the term "example" as used herein to describe some embodiments is intended to indicate that some embodiments are possible examples, representations, and/or illustrations of possible embodiments (and such term is not intended to connote that some embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Some embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, embodiments include all modifications and equivalents of the subject matter recited in the claims appended hereto as permitted by applicable law. Moreover, any combination of the above-described elements in all possible variations thereof is encompassed by the embodiments unless otherwise indicated herein or otherwise clearly contradicted by context.

It is important to note that the construction and arrangement of the various embodiments are illustrative only. Although some embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein.

While this specification contains many specific implementation details, these should not be construed as limitations on the scope of this disclosure or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A skid assembly comprising:
a skid having a stacking surface;
a first gum roll positioned on the stacking surface; and
a second gum roll positioned on the first gum roll;
wherein the first gum roll and the second gum roll are formed of a strip stock wound onto a core fixture, and wherein the strip stock is coated with a powder or coating that prevents the strip stock from adhering to itself while being wound into the first gum roll and the second gum roll.

2. The skid assembly of claim 1, further comprising a first film layer interposed between the first gum roll and the second gum roll.

3. The skid assembly of claim 1, wherein the first gum roll defines a first outer roll diameter and the second gum roll defines a second outer roll diameter, the first outer roll diameter and the second outer roll diameter being between 40-60 inches, inclusive.

4. The skid assembly of claim 3, further comprising a third gum roll positioned on the second gum roll, the third gum roll defining a third outer roll diameter, the third outer roll diameter being less than the second outer roll diameter.

5. The skid assembly of claim 4, wherein the third outer roll diameter is between 20-30 inches, inclusive.

6. A skid assembly comprising:
a skid having a stacking surface;
a first gum roll positioned on the stacking surface;
a second gum roll positioned on the stacking surface and abutting the first gum roll, the first gum roll and the second gum roll cooperating to define a first skid layer;
a third gum roll positioned on one of the first gum roll or the second gum roll; and
a fourth gum roll positioned on one of the second gum roll or the first gum roll, the fourth gum roll abutting the third gum roll, the fourth gum roll and the third gum roll cooperating to form a second skid layer;
wherein the first gum roll, the second gum roll, the third gum roll, and the fourth gum roll are formed of a strip stock wound onto a core fixture, and wherein the strip stock is coated with a powder or coating that prevents the strip stock from adhering to itself while being wound into the first gum roll, the second gum roll, the third gum roll and the fourth gum roll.

7. The skid assembly of claim 6, wherein each of the first gum roll, the second gum roll, the third gum roll, and the fourth gum roll are individually wrapped in poly film.

8. The skid assembly of claim 6, wherein each of the first gum roll, the second gum roll, the third gum roll, and the fourth gum roll are skid wrapped together.

9. The skid assembly of claim 6, the first gum roll defining a roll thickness between 5-6 inches, inclusive.

10. The skid assembly of claim 9, wherein the first gum roll defines an outer roll diameter between 40-46 inches, inclusive.

* * * * *